Figure 2:
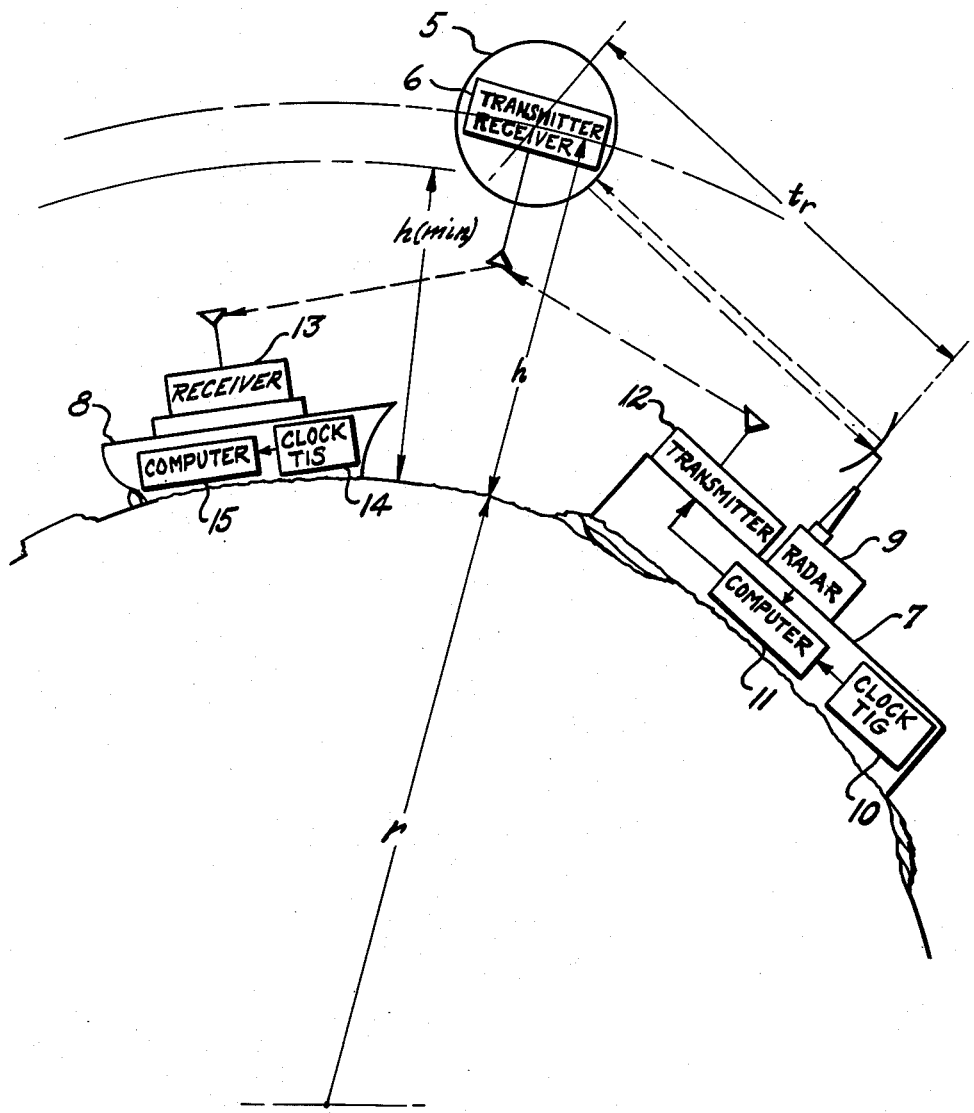

March 24, 1964     I. D. SMITH, JR     3,126,545
SATELLITE HYPERBOLIC NAVIGATION SYSTM
Filed Nov. 23, 1960     2 Sheets-Sheet 1
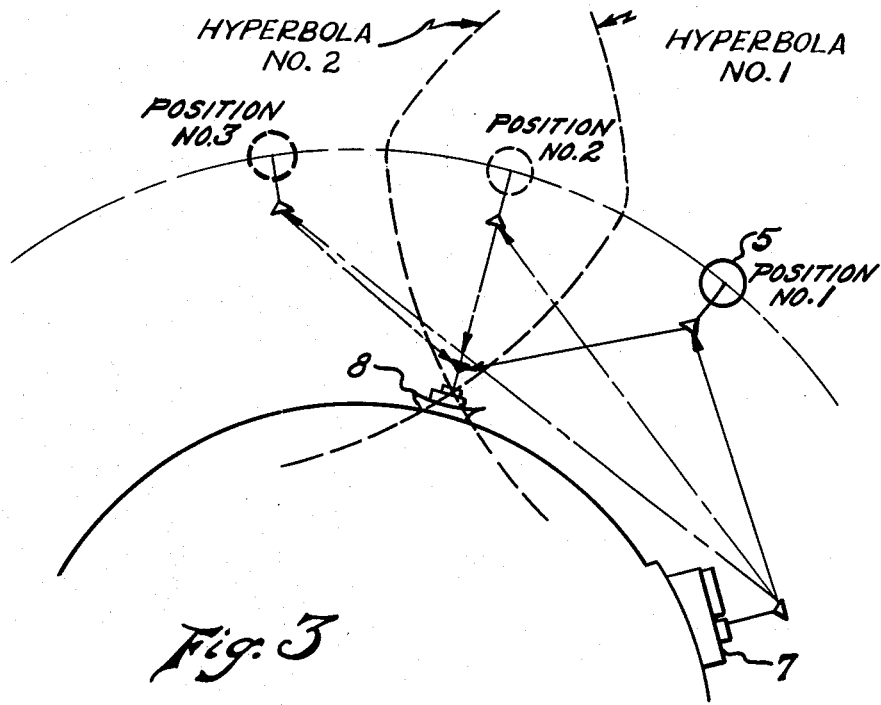
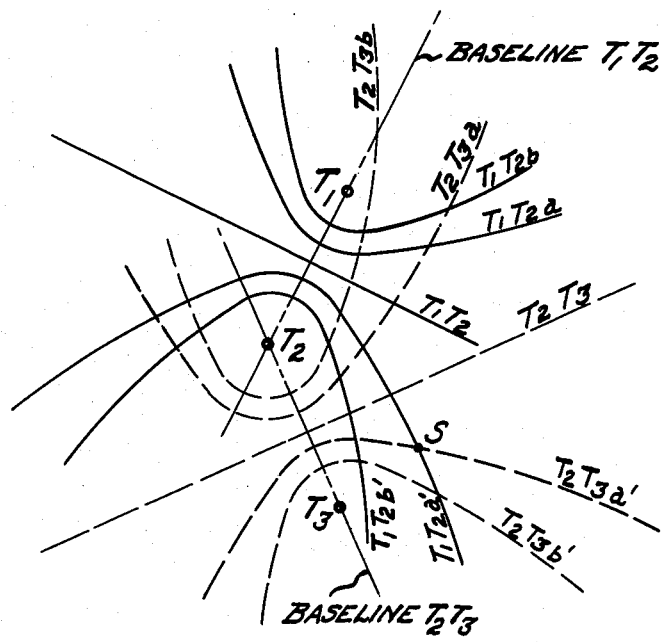
PRIOR ART
INVENTOR.
IRA D. SMITH, JR.
BY
Willard R. Matthew jr
ATTORNEYS

United States Patent Office 3,126,545
Patented Mar. 24, 1964

3,126,545
SATELLITE HYPERBOLIC NAVIGATION SYSTEM
Ira D. Smith, Jr., Rome, N.Y., assignor to the United
States of America as represented by the Secretary of
the Air Force
Filed Nov. 23, 1960, Ser. No. 71,371
6 Claims. (Cl. 343—103)
(Granted under Title 35, U.S. Code (1952), sec. 266)

The invention described herein may be manufactured and used by or for the United States Government for governmental purposes without payment to me of any royalty thereon.

This invention relates generally to navigational systems, and more particularly to a long range hyperbolic navigation system, including a satellite relay station whereupon omnidirectional transmission of position and time information may be accomplished without regard to weather conditions or sky-wave characteristics.

Conventional hyperbolic navigation systems are subject to certain limitations which, in many instances, reduce their practicability. The transmission of pulse information at very high frequencies reduces the effective range of such a system to line-of-sight distances. The use of sky-wave transmission to overcome this limitation is effective only at night and is inherently inaccurate. Systems employing lower frequency transmission are subject to interference from changing weather conditions. This is especially true of electrical disturbances which may render the transmitted pulse information completely unintelligible. A further undesirable feature of current hyperbolic navigation systems is the requirement of a minimum of three fixed transmitting stations. Such stations, being at certain fixed locations, present to the area covered a limited number of predetermined base lines. The inflexibility of such a system precludes the selection of optimum base lines by the majority of ships using said system.

It is accordingly an object of this invention to provide a hyperbolic navigation system that is substantially independent of weather conditions.

It is another object of this invention to provide a novel method of navigating ships at sea wherein said ships are oriented by the several positions of an orbiting satellite station.

It is a further object of this invention to provide a hyperbolic navigation system having greater range and accuracy than has heretofore been possible.

It is a still further object of this invention to provide a hyperbolic navigation system whereby ships using such system may choose any number of optimum base lines.

It is a still further object of this invention to provide a satellite hyperbolic navigation system employing the use of sequential base lines, thereby rendering synchronizing and timing less critical.

It is a still further object of this invention to provide a satellite navigation system of the type described wherein highly accurate orbital computations are unnecessary.

These and other objects, together with the principles of the invention itself, will be described in detail with reference to the accompanying drawings in which:

FIG. 1 presents families of curves illustrating the principles of hyperbolic navigation;

FIG. 2 illustrates the apparatus required to transmit satellite position-time information in accordance with the principles of my invention; and FIG. 3 illustrates a presently preferred method of navigating a ship by the application of said apparatus and principles.

Referring now to FIG. 1, there is illustrated three stations $T_1$, $T_2$ and $T_3$ which are typical of a conventional hyperbolic navigation system, and a ship S to be navigated. High powered pulses are sent out from a transmitter at station $T_1$ and also from a transmitter at station $T_2$. A constant known time difference is maintained between the instance of departure of these pulses, so that the time difference of arrival of the pulses as observed at a receiving point becomes a measure of the difference in distance of this receiving point from the two transmitters. It follows, then, that since a hyperbola is a curve that gives the locus of a point such that the difference in distances from any point on the curve to two fixed points is constant, a particular difference in distance corresponds to a receiving point located somewhere on that hyperbola. In the present instance this is hyperbola $T_1T_2a'$ of the family of hyperbolas appearing between stations $T_1$ and $T_2$ as indicated in said FIG. 1. A second pair of transmitters, one located at station $T_2$ and the other located at stations $T_3$, can now be used to determine a second hyperbola, $T_2T_3a'$ in the present instance, the intersection of which with hyperbola $T_1T_2a'$ gives the position of ship S.

The several disadvantages of the navigation system described above have been substantially obviated by my invention which comprehends, in its simplest form, the use of a satellite relay station in combination with a single fixed ground station. As said satellite orbits within the field of view of automatic tracking radar apparatus located at said fixed ground station, its position is determined by the radar and indexed with time by a ground station clock. This position and time information is then telemetered to the satellite whose receiver-transmitter equipment relays it omnidirectionally to all ships located within its area of coverage. The ship, upon receiving said information, indexes it with shipboard time. After a suitable period of time the ship receives a second position message from the same satellite and indexes it with a new shipboard time. The two position messages thus received establish two points in space (focal points) and a baseline therebetween from which a hyperbolic surface of revolution can be established which intersects the earth's surface. At this point the navigator on the ship can establish a hyperbola, and he knows that he is somewhere on this hyperbola, but not exactly where he is on it. The distance is based on the primary fact that the transmission time taken by a pulse to travel over a distance is a measure of the distance. The unit of length in navigation computations may be called a light-microsecond; for example, 983.24 feet is the unit of length equivalent to a light-microsecond which represents the distance that a pulse travels in that time. In order for the navigator to locate himself definitely the ship receives a third position message which it indexes with a third shipboard time, thus establishing the second hyperbola. This second hyperbola because of the predetermined time difference must intersect the first hyperbola. Every intersection of these two hyperbolas represent measured time differences which is equivalent to measured distances and defines the fix of the position of the ship.

With reference now to accompanying drawings, FIGS. 2 and 3, and in conjunction with the several equations to be hereinafter developed, the various symbols used are herein defined as:

$r$ = radius of the earth
$h$ = altitude of the satellite
$h(\min.)$ = minimum altitude of the satellite
$t_r$ = radar slant range of the satellite
$t_r(\min.)$ = minimum slant range of the satellite
$t_s$ = range of the ship from the satellite
$t_{da}$ = time delay of satellite receiver-transmitter
$t_{dg}$ = time delay of the ground station radar $t_{ds}$ = time delay of the shipboard equipment
$\theta_z$ = azimuth angle of the satellite from the radar
$\theta_L$ = elevation angle of the satellite from the radar
$\alpha, \gamma$ = angular coordinates of the satellite from the earth's center
$t_e$ = synchronization error of the radar clock and the shipboard clock
$t_{lg}$ = a shore time index inserted into the satellite position message by the radar clock
$t_{ls}$ = ship time index attached to the received position message by the shipboard clock
$c$ = speed of light There is illustrated in FIG. 2 and FIG. 3 the apparatus and the system geometry used in relaying position messages to a ship to be navigated, in accordance with my invention. In operation, automatic tracking radar 9 determines the position of satellite 5 in range ($t_r$), azimuth ($\theta_z$), and elevation ($\theta_L$). The position of satellite 5 is then indexed ($t_{lg1}$) by radar clock 10. This time-position information is then fed to computer 11 which is one of two—computer 15 being the other—computers used in the system, both being of type such as the ground-position indicator computor designed at the MIT Radiation Laboratory and of the specific coordinate integrator computer type widely used in radar trainers; both types described in vol. XXI of the MIT Radiation Laboratory series, pages 173 through 194 of the 1948 edition.

Patents describing the type of computer which can be used in the preferred embodiment are: U.S. Patent 2,499,225 issued on Feb. 28, '50; 2,513,490 issued on July 4, '50; and 2,528,202 issued on Oct. 31, '50. Computer 11 transfers the radar coordinates of satellite 5 into angular coordinates ($\alpha, \gamma, r$ and $h$) from the earth's center, for the purpose of simplifying the computing process on board ship 8. Transmitter 12, located at ground station 7, then transmits telemetered information comprising $\alpha_1, \gamma_1, h_1-h(\min.)$ (instead of $r+h$ to save binary digits), $t_{lg1}+t_{r1}$, and station identification to satellite 5. Said telemetered information is received and relayed omnidirectionally to all ships within its area of coverage by satellite transmitter-receiver 6. When this telemetry data is received by receiver 13 of ship 8, it is indexed with shipboard time $t_{ls1}$ as supplied by shipboard clock 14. Therefore since:

$$t_{ls1} = t_{lg1} + t_{dg} + t_{r1} + t_{da} + t_{s1} + t_{ds} + t_e \quad (1)$$

shipboard computer 15 performs the operation:

$$t_{s1} + [t_e + t_{da} + t_{ds} + t_{dg}] = t_{ls1} - (t_{lg1} + t_{r1}) \quad (2)$$

An optimum time later, a second message is transmitted to ship 8 in the same manner comprising $$t_{s2} + [t_e + t_{da} + t_{ds} + t_{dg}] = t_{ls2} - (t_{lg2} + t_{r2}) \quad (3)$$

Since $t_e$, $t_{da}$, $t_{ds}$ and $t_{dg}$ are constants in both position messages, they cancel out and the simultaneous solution of equation (2) and (3) results in $$t_{s2} - t_{s1} = t_{ls2} - (t_{lg2} + t_{r2}) - [t_{ls1} - (t_{lg1} + t_{r1})] \quad (4)$$

A hyperbolic locus of points can now be constructed using $c(t_{s2}-t_{s1})$ since the differences in the distances from each point on the hyperbola to the two positions of the satellite (focal points) are constant.

A suitable time later the ship receives a third position message from which $c(t_{s3}-t_{s2})$ is computed. A second hyperbolic locus is then formed using the second and third, or first and third satellite position as focal points. If desired, for greater accuracy, three hyperbolic surfaces may be developed using all three satellite positions. The ship's position is, of course, located at the point of intersection of these hyperbolic surfaces with the earth's surface. Shipboard computer 15, then, knowing the positions of the focal points can generate the equation for the hyperbolic surfaces and solve them simultaneously with the equations for the earth's surface.

It may be readily seen, therefore, that since the satellite positions form the geometric baseline of the navigation problem, said baselines are variable and the ship can choose the baseline best suited for its position.

It is also apparent that, in the present invention, the baselines are formed sequentially, rather than simultaneously, with time synchronization being provided for from only two clocks. Therefore, a time synchronization error can exist, providing it does not vary significantly during $t_{lg1}$ to $t_{ls3}$.

It is further pointed out that longer ranges can conceivably be achieved because of the presence of the high altitude relay stations and that such a navigation system is substantially insensitive to time of day, sky-wave conditions, and weather.

There has thus been disclosed novel concepts and apparatus whereby the several objects of my invention have been accomplished. It is, however, not intended that the invention described in the foregoing specification be limited to the details shown, which details are considered to be illustrative of one presently preferred embodiment only, but to be limited only to the extent of the following claims.

What is claimed is:

1. The method of utilizing an orbiting satellite as an aid to navigating a moving craft in accordance with the principles of hyperbolic navigation comprising the steps of transmitting to said craft at least three satellite time-position messages, determining from the time difference of arrival of a first pair of messages a hyperbola upon whose locus said craft resides, determining from the time difference of arrival of a second pair of messages a second hyperbola upon whose locus said craft resides, simultaneously solving the equations of said hyperbolas and directing the course of said craft in accordance with said solution.

2. The method of utilizing an orbiting satellite as an aid to navigating ships at sea, said satellite having as an integral part thereof telemetry transmitter-receiver apparatus, from a ground station determining a plurality of satellite positions, comprising the steps of correlating said position information with ground station time, transmitting said time-position information via said satellite transmitter-receiver apparatus to said ships at sea, correlating said time-position information with shipboard time, said time-correlation being a measure of the distance of said ship from said satellite, developing from said satellite time-position information at least two hyperbolic equations, and simultaneously solving said equations, with an equation representing the surface of the earth.

3. A long range hyperbolic navigation system comprising an orbital satellite station, means for determining a plurality of satellite positions, means for transmitting a plurality of satellite time-position information messages to the craft to be navigated, and means for correlating said time-position information with shipboard time, whereby said craft is successively informed of its distance from successive satellite positions, and means for deriving from said information a set of hyperbolic curves whose intersections serve to orient said craft.

4. A long range satellite navigation system comprising, in combination, an orbital satellite station, said satellite station including means for relaying a plurality of satellite time-position information messages omnidirectionally to all ships within its area of coverage; at a ground station, means for determining the position of said satellite, means for indexing said position information with ground station time, and means for transmitting a plurality of said time-position messages to said satellite; and as an integral part of each ship to be navigated, apparatus including means for receiving said time-position information messages, means for indexing said time-position information messages with shipboard time, whereby each of said ships is informed of its distance from the satellite, and computer means adapted to develop from a plurality of said time-position messages equations for at least two hyperbolas, the intersection of which locate said ship.

5. A long range hyperbolic navigation system as defined in claim 3 wherein said means for determining a plurality of satellite positions comprises tracking radar apparatus, said radar apparatus being an integral part of a fixed ground station.

6. A long range hyperbolic navigation system as defined in claim 3 wherein said means for transmitting said time-position information to said craft to be navigated comprises telemetry transmitter apparatus in combination with means for indexing said satellite position information with ground station time.

References Cited in the file of this patent

"Transit," Space Aeronautics, June 1960, pp. 154–7.